United States Patent
Berreman

[15] 3,652,150
[45] Mar. 28, 1972

[54] TRANSPARENT MEMBRANES FOR GAS LENSES AND LIGHT GUIDANCE SYSTEM EMPLOYING SAME

[72] Inventor: Dwight W. Berreman, Westfield, N.J.
[73] Assignee: Bell Telephone Laboratories, Incorporated, Murray Hill, N.J.
[22] Filed: July 1, 1968
[21] Appl. No.: 741,449

[52] U.S. Cl. .................................. 350/179, 350/96, 350/286
[51] Int. Cl. ............................................................. G02b 1/06
[58] Field of Search ........................... 350/179, 180, 175, 96

[56] References Cited

UNITED STATES PATENTS

| 504,890 | 9/1893 | Ohmart | 350/179 UX |
| 2,300,251 | 10/1942 | Flint | 350/180 |
| 3,169,163 | 2/1965 | Nassenstein | 350/175 GN UX |
| 3,382,022 | 5/1968 | Fox | 350/96 X |
| 3,454,330 | 7/1969 | Smith | 350/287 |

OTHER PUBLICATIONS

Hauser et al., " Easily Mounted Aluminum Oxide Foils for Windows and Backings" The Review of Scientific Instruments, Vol. 29, No. 5, May 1958, pp. 380– 382.

*Primary Examiner*—John K. Corbin
*Attorney*—R. J. Guenther and Edwin B. Cave

[57] ABSTRACT

Optical elements are formed of static gases of various refractive indices separated by optically thin transparent membranes, such as collodion or aluminum oxide films. Lenses are described having flat, approximately cylindrical and approximately spherical surfaces, and formulas are provided which are useful for the designing of a light guidance system using these lenses.

18 Claims, 4 Drawing Figures

PATENTED MAR 28 1972　　3,652,150

INVENTOR
D. W. BERREMAN
BY
ATTORNEY

TRANSPARENT MEMBRANES FOR GAS LENSES AND LIGHT GUIDANCE SYSTEM EMPLOYING SAME

BACKGROUND OF THE INVENTION

1. Field of the Invention

This invention relates to the long distance transmission of beams of electromagnetic wave energy, including visible light and adjacent frequencies within the wavelength range of from 0.1 microns to 200 microns and to the prevention of scattering of the rays of such beams, during transmission.

2. Prior Art

Laser generated highly directive beams of the coherent, high frequency electromagnetic wave energy, principally in the visible and adjacent energy bands, having wavelengths from about 1,000 to 2 million angstroms, are recognized as having extremely large capabilities for the long distance transmission of intelligence such as speech, video, data signals, etc.

However, transmission of these beams over substantial distances is accompanied by a very appreciable spreading of the beam, i.e., attenuation, resulting in a significant diminution of the energy received at a distant point on the axis of the beam, and also resulting in the possibility of interception of portions of the beam by stations other than the intended receiving station.

Enclosing the beam in a conduit filled with a transmission medium of uniform characteristics, so as to eliminate the effects of a changing atmospheric condition and the possibility of beam interception, may result in the multiple reflection of the spreading rays by the conduit walls, seriously distorting the transmitted signals.

It has been recognized that beam spreading may be substantially eliminated by the use of a series of positive lenses along the beam path to divert the outer rays toward the central axis of the path. It has also been recognized that many of the problems associated with the use of glass lenses can be overcome if instead a very low index focusing medium such as a gas is used. For example, the use of gas lenses practically eliminates reflection losses at the lens surfaces.

In a practical guidance system, however, in which a large number of lenses are distributed at great distances from one another, it is likely that such lenses will be slightly and randomly displaced from coaxially distributed positions, thus causing the beam to "wander," i.e., to oscillate about the axis of the intended transmission path. Since some beam wander is practically unavoidable, large aperture lenses are desirable to insure that significant portions of the beam are not lost from the transmission path. Present gas lenses depend upon substantially laminar flow of the gases for their operation, whether such flow is by forced convection, thermal convection or other means. Thus, the lens diameters, and consequently the lens apertures, are limited by the onset of turbulent flow at critical flow velocities, which are very small unless diameters are very small.

SUMMARY OF THE INVENTION

The problems associated with glass lens and moving-gas lens guidance systems are avoided by the employment of static gases of differing refractive indices, separated by optically thin transparent membranes, as optical elements.

According to the invention, reflection losses at the membrane surfaces are minimized by maintaining their thicknesses at either a small fraction of the wavelength of the beam radiation, or at an integral multiple of one-half the wavelength of the radiation.

DETAILED DESCRIPTION

The membrane may be any solid material which can be formed into optically thin sheets of sufficient size, mechanical strength, gas-imperviousness and transparency for the use contemplated.

An excellent example of such a material is $Al_2O_3$. Preparation of films of $Al_2O_3$ is described in the art, and thus a detailed description of them is considered unnecessary. A detailed procedure involving anodization of aluminum to form the oxide film, followed by dissolution of the aluminum, described by Hauser et al. in the "Review of Scientific Instruments," 29, 380 (1958), results in gas-tight, smooth, transparent, pressure resistant films, of easily controllable and uniform thickness of from 700 to 7,000 angstroms. Such a procedure is desirable in that it enables the formation of films in a variety of configurations such as sheets or spherically-shaped films, by means of shaping the surface of the aluminum to be anodized, to correspond to the desired shape of the film; and in that it enables the formation of a supporting frame by means of selectively dissolving the aluminum subsequent to anodization. Aluminum oxide films having thicknesses as small as 200 angstroms have been obtained in a similar way.

Figure 1:
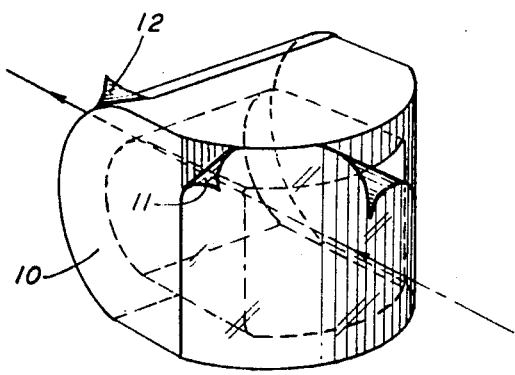
FIG. 1 is a perspective view of a static gas lens having cylindrical surfaces, according to the invention.

For ease of fabrication of lenses, it may be preferred to form flat sheets of the membrane of sufficient thinness to permit formation of cylindrical surfaces by bending. FIG. 1 depicts a lens having a frame 10 shaped so that two cylindrical membrane surfaces 11 and 12 are formed which have their axes at right angles. Such a lens focuses radiation passing through it much as if the surfaces were spherical.

For a given film material of given thickness, it should be noted that the amount of overpressure that can be applied without rupture increases as the radius of curvature decreases.

Figure 2:
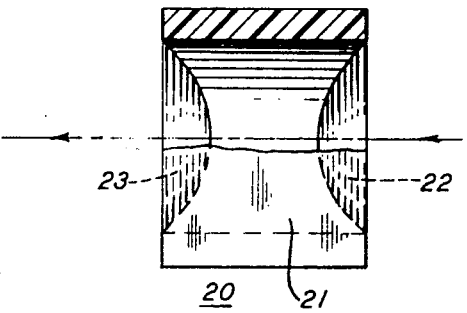
FIG. 2 is a cross sectional view of a static gas lens having a spherical surface, according to the invention.

Elastic materials may be preferred over rigid materials such as $Al_2O_3$ where approximately spherical surfaces are desired, since such surfaces may be formed by maintaining an overpressure on the outside of a flat elastic membrane, so as to force it to expand slightly. Such a lens is exemplified by the configuration depicted in FIG. 2, wherein frame 20 and membranes 22 and 23 form chamber 21, which contains a gas at a lesser pressure than a gas outside chamber 21.

One such elastic material suitable for use in such lenses is known as collodion, and is composed of nitrocellulose carried in a volatile solvent such as ether, alcohol, amyl acetate or acetone. Films may be formed by dropping collodion onto a clean water surface, the thickness of the film depending upon the amount deposited, and the size depending upon the size of the water surface. Films having paraboloidal surfaces may be formed by dropping collodion onto the surface of a rotating body of water.

It should be noted that the slight permeability of some materials such as collodion to some gases may necessitate a slow flushing of the gases, particularly in the low pressure side, to maintain a constant difference in refractive index across the membrane. In particular, it may be desirable to avoid the use of gases which have large diffusion constants, such as He and Ar, in order to avoid the necessity for recycling. Alternatively, lenses having concave surfaces and the interior gas of smaller refractive index than the surrounding gas and at a slight underpressure may be desirable in that most of the contamination due to diffusion would be in the small volume of the lens, thus minimizing the necessity for flushing the larger volume of surrounding gas.

Of course it is possible and will often be advantageous to mix different gases to give any desired refractive index or density. For example, where very thin elastic membranes are employed, it may be desirable to choose gases which while having different refractive indices, have about the same densities, so as to minimize aberrations due to a gravity effect. One example of a pair of such gases would be air, having an index of 1.00029 and a density of 0.00129 grams per cubic centimeter, and ethane, having an index of 1.00075, and a density of 0.00125 grams per cubic centimeter, all at 0° C. and 1 atmosphere.

The thickness of the membrane desired will in general depend upon the wavelength of the radiation, the size and strength of the membrane desired, the permeability of the membrane and the ease with which uniformity of thickness is attained. In order to minimize reflection losses at the membrane surfaces, its thickness should be a small fraction of the wavelength of the radiation or an integral multiple of one-half the wavelength inside the solid membrane medium. The wavelength inside the membrane is determined by the following relation, in which $n$ is the refractive index of the membrane medium and $\lambda_o$ is the radiation wavelength in vacuum; $\lambda$ inside $= \lambda_o/n$, for $Al_2O_3$, $n$ is about 1.65 for visible light.

In general, it can be said that where the thickness of the membrane is less than about one-tenth the wavelength of the radiation, the reflection loss is negligible. Thus, when a material is chosen which is difficult to form into membranes of uniform thickness, a thickness smaller than one-half the wavelength may be preferred to ease the tolerance on thickness. It will be appreciated that one advantage inherent in the use of focusing media such as gases, giving rise to small differences in refractive index across the lens surface, is the small loss due to surface irregularities, thus resulting in a large surface configuration tolerance for the membranes, as compared to focusing media having large differences in refractive index, such as glass lenses in air.

The physical principles upon which the invention is based give rise to several relationships which are useful in the design of a light guidance system using the lenses described. As will be seen from these relationships, the adjustment of the various parameters involved permits great flexibility in the design of a practical system.

Figure 4:
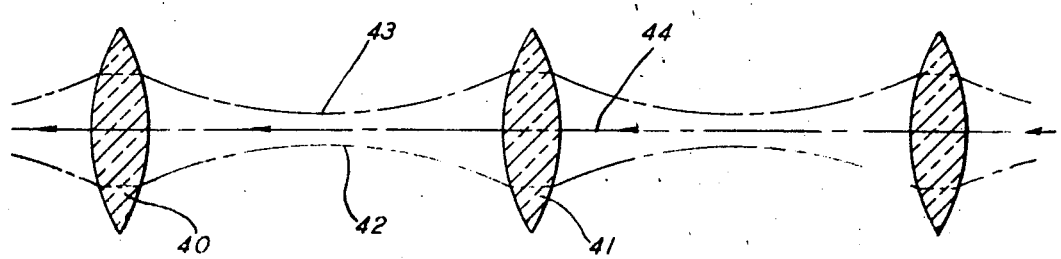
FIG. 4 is a schematic diagram of a guidance system using the lenses of the invention.

For purposes of illustration only, the case for transmission along a straight line path will be treated. Most convenient for this purpose is the distribution of positive lenses of equal strengths at equal separations along the transmission path as shown schematically in FIG. 4. In the figure, 40 and 41 represent lenses, 42 and 43 define the boundaries of the Gaussian beam mode diameter, and 44 represents the central axis of the intended transmission path. Such a configuration results in the repeated slight convergence of the outer rays of a light beam toward axis 44 at each lens, so as to substantially eliminate "beam spreading." The somewhat arbitrary choice of a lens separation equivalent to the lens focal length was likewise chosen for convenience. However, it should be noted that for lens separations larger than four focal lengths, the lens system will not confine the beam, and for lens separations much smaller than the focal length, the number of lenses may be economically undesirable.

It may be shown for lenses separated by their focal length, that $$f = \frac{5.45 b_l^2}{\lambda} \quad (1)$$

and that $$(n_2 - n_1)(t_0 - t_e) \approx \frac{R^2}{Rf} \quad (2)$$

if $n_1$ and $n_2$ are about unity, where $f$ is the lens focal length, $b_l$ is the Gaussian beam mode diameter at the lens, $R$ is the radius of the lens opening, $t_0$ is the lens thickness at its center, $t_e$ is the lens thickness at its edge, $n_2$ is the refractive index of the medium inside the lens, $n_1$ is the refractive index of the medium outside the lens and $\lambda$ is the wavelength of the radiation.

Reasonable additional parameters for straight line propagation include;

$$(t_0 - t_e) = \frac{R}{3} \quad (3)$$

which describes an easily obtainable shape for any size lens;

$$\lambda = 10,000 \text{ Å. or } 10^{-4} \text{ cm.} \quad (4)$$

(near infrared light); and $$R = 6 b_l. \quad (5)$$

Equation (5) results in a system which allows beam wander up to a distance $R/2$ with little light loss. The remaining parameters may be described as dependent upon those set forth above.

Combining equations (2) and (3) results in $$(n_2 - n_1) = \frac{3R}{2f} \quad (6)$$

Combining Equations (1) and (5) results in $$f = \frac{5.45 R^2}{36 \lambda} \quad (7)$$

Combining Equations (6) and (7) results in $$(n_2 - n_1) = 9.91 \frac{\lambda}{R} \quad (8)$$

Combining Equations (4) and (8) results in $$(n_2 - n_1) \approx \frac{10^{-3}}{R} \text{ cm.} \quad (9)$$

Typical results are obtained by choosing carbon dioxide as the medium inside the lens and air as the medium outside the lens, which mediums have refractive indices equal to 1.000405 and 1.000266 respectively. From equation (9), therefore, the radius of the lens opening $R$ is approximately equal to 7.2 centimeters. From equation (6) the focal length $f$ is approximately equal to $7.8 \times 10^4$ centimeters, which is approximately equal to one-half mile.

Where the medium inside the lens is chosen to be one-half carbon dioxide and one-half air and the medium outside the lens remains air, the radius of the lens opening is doubled and the focal length is increased by a factor of 4.

Figure 3:
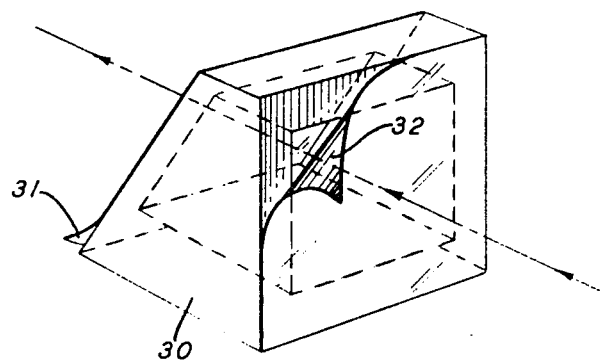
FIG. 3 is a perspective view of a static gas prism according to the invention.

The above results are illustrative only and apply only to straight line propagation. For example, where the transmission path is intended to be curved, the radius of the lens opening should be many times larger or prisms should be used, as is known in the art. Accordingly, a variety of lens configurations and combinations, as well as other optical elements, such as the prism depicted in FIG. 3, wherein frame 30 supports flat membranes 31 and 32, will become obvious to those skilled in the art, and are intended as being encompassed within the scope of the invention and the appended claims.

What is claimed is:

1. A light guidance system for use in the long distance transmission of beams of coherent monochromatic radiation through a gaseous transmission medium, said system comprising:
   a plurality of optical elements, at least a portion of these elements being substantially coaxially distributed,
   characterized in that each of said elements has at least two transparent surfaces, at least one gas having a refractive index different from that of said transmission medium and at least two transparent membranes forming each of said transparent surfaces and separating said gas from said medium,
   and further characterized in that said membranes have a thickness of up to one-tenth the wavelength of the radiation in said membranes.

2. The elements of claim 1 in which at least a portion of said membrane is approximately cylindrically shaped so as to result in positive focusing of a beam of radiation passing through said element.

3. The element of claim 1 in which at least a portion of said membrane is approximately spherically shaped so as to result in positive focusing of a beam of radiation passing through said element.

4. The element of claim 1 in which said membrane comprises at least one flat surface, said surface being slanted with relation to an incident beam of radiation so as to result in refraction of said beam passing through said element.

5. The element of claim 1 in which said membrane is $Al_2O_3$.

6. The system of claim 1 in which at least a portion of said elements are positive lenses distributed substantially colinearly along the central axis of a light beam transmission path, so as to result in the slight convergence of the outer rays of a light beam toward said central axis at each lens.

7. The system of claim 6 in which said positive lenses are concave and contain gases having refractive indices smaller than the refractive index of the surrounding medium.

8. The system of claim 6 in which said positive lenses are convex and contain gases having refractive indices larger than the refractive index of the surrounding medium.

9. The element of claim 1 in which said membrane is collodion.

10. A light guidance system for use in the long distance transmission of beams of coherent monochromatic radiation through a gaseous transmission medium, said system comprising:
   a plurality of optical elements, at least a portion of these elements being substantially coaxially distributed,
   characterized in that each of said elements has at least two transparent surfaces, at least one gas having a refractive index different from that of said transmission medium and at least two transparent membranes forming each of said transparent surfaces and separating said gas from said medium,
   and further characterized in that said membranes have a thickness equal to an integral multiple of one-half the wavelength of the radiation in said membranes.

11. The elements of claim 10 in which at least a portion of said membrane is approximately cylindrically shaped so as to result in positive focusing of a beam of radiation passing through said element.

12. The element of claim 10 in which at least a portion of said membrane is approximately spherically shaped so as to result in positive focusing of a beam of radiation passing through said element.

13. The element of claim 10 in which said membrane comprises at least one flat surface, said surface being slanted with relation to an incident beam of radiation so as to result in refraction of said beam passing through said element.

14. The element of claim 10 in which said membrane is $Al_2O_3$.

15. The system of claim 10 in which at least a portion of said elements are positive lenses distributed substantially colinearly along the central axis of a light beam transmission path, so as to result in the slight convergence of the outer rays of a light beam toward said central axis at each lens.

16. The system of claim 10 in which said positive lenses are concave and contain gases having refractive indices smaller than the refractive index of the surrounding medium.

17. The system of claim 10 in which said positive lenses are convex and contain gases having refractive indices larger than the refractive index of the surrounding medium.

18. The element of claim 10 in which said membrane is collodion.

* * * * *